United States Patent [19]

Merrell

[11] 4,333,661
[45] Jun. 8, 1982

[54] EXPANDING HELICAL SEAL FOR PISTONS AND THE LIKE

[75] Inventor: David A. Merrell, Manhattan Beach, Calif.

[73] Assignee: Hughes Aircraft Company, Culver City, Calif.

[21] Appl. No.: 213,429

[22] Filed: Dec. 5, 1980

[51] Int. Cl.³ ............................ F16J 15/16; F16J 9/04
[52] U.S. Cl. ...................................... 277/203; 277/138
[58] Field of Search ............... 277/167, 203, 138, 163, 277/165, 236

[56] References Cited

U.S. PATENT DOCUMENTS

| Re. 27,338 | 4/1972 | Cowans | 62/6 |
|---|---|---|---|
| 206,695 | 8/1878 | Vivarttas | 277/203 |
| 208,368 | 9/1878 | Brown | 277/203 X |
| 791,073 | 5/1905 | Callan | 277/203 X |
| 1,727,732 | 9/1929 | Ryan | 277/203 X |
| 2,125,541 | 8/1938 | Carlton | 277/203 |
| 2,585,952 | 2/1952 | Marien | 277/138 |
| 2,809,080 | 10/1957 | Mittell et al. | 277/203 X |
| 2,871,072 | 1/1959 | Parks et al. | 277/203 X |
| 3,162,185 | 12/1964 | Knoblock | 277/203 X |
| 4,239,245 | 12/1980 | Giglio et al. | 277/203 |

FOREIGN PATENT DOCUMENTS

| 42277 | 1/1888 | Fed. Rep. of Germany | 277/203 |
|---|---|---|---|
| 948622 | 1/1949 | France | 277/203 |
| 20203 | of 1905 | United Kingdom | 277/203 |
| 559736 | 3/1944 | United Kingdom | 277/203 |

Primary Examiner—Robert S. Ward, Jr.
Attorney, Agent, or Firm—Allen A. Dicke, Jr.; W. H. MacAllister

[57] ABSTRACT

A seal 34 formed of a resilient helical coil 42 which is stressed at its small end to form a stationary seal in its groove 36 and stressed to unwind at its large end 44 to form a dynamic seal against the cylinder wall 22. A helical coil 56 of low friction material can be interleaved to supply dry lubricant.

5 Claims, 5 Drawing Figures

EXPANDING HELICAL SEAL FOR PISTONS AND THE LIKE

The Government has rights in this invention pursuant to Contract No. F-33615-78-C-3419 awarded by the Department of Defense.

BACKGROUND OF THE INVENTION

This invention is directed to a helical seal for sealing between cylindrical sliding members. The helical seal is stressed so that part of the seal engages against the stationary member and part engages against the moving member. The seal is stressed so that it unwinds when wear takes place to supply further material subject to wear and maintains sealing force.

The provision of a long life seal between reciprocating parts has long been a design challenge. The challenge is particularly severe where the seal is not provided with a lubricant from an external source, or is operated in a vacuum or other difficult environment. Previous types of seal configuration required compression of a resilient seal material followed by the return of the seal material to its previous configuration. "O" ring seals of that type are made of rubber-like synthetic polymer composition materials, made of polytetrafluoroethylene or the like. They have a limited amount of material which can wear away before the seal becomes ineffective. Some "C" section seals wear in the same manner, but sometimes have garter springs therein to provide additional force to increase sealing forces. Other seals have a gap between facing ends. The internal combustion engine piston ring seal is of this nature. Furthermore, there are segmented seals having wedge-shaped segments which expand as the material wears away.

Thus, there is a need for an improved seal for application between sliding parts, particularly for the sealing around pistons and piston rods, and particularly in environments where lubrication is difficult, or in environments where separate lubrication can not be applied because it would contaminate the fluid being controlled by the seal.

SUMMARY OF THE INVENTION

In order to aid in the understanding of this invention, it can be stated in essentially summary form that it is directed to a helical seal for sealing between relatively sliding parts such as pistons and piston rods. The helical seal is comprised of at least one helix of resilient material formed so that a portion of the helix is externally larger than another portion to provide a stationary seal, a dynamic seal and a transition portion therebetween so that the diameter is controlled by the winding of the helix and unwinding accommodates for wear to maintain the dynamic seal.

It is thus a purpose and advantage of this invention to provide a long life dynamic seal in the form of a helix so that as material is worn away, it is replaced by unwinding of the helix, and no increase in leak path results. It is a further advantage and purpose of this invention to provide a helical seal made of hard, long wearing material which does not depend on stretching. Furthermore, a soft material which provides a molecular lubricating layer may be interwound with the hard seal helix to provide lubricant. It is another purpose and advantage of this invention to provide a helical seal which unwinds to overcome material losses through wear, and which may be backed by a spring to complement the resiliency of the helical seal itself.

Other purposes and advantages of this invention will become apparent from the study of the following portion of the specification, the claims and the attached drawings.

DESCRIPTION OF THE PREFERRED EMBODIMENT

Figure 1:
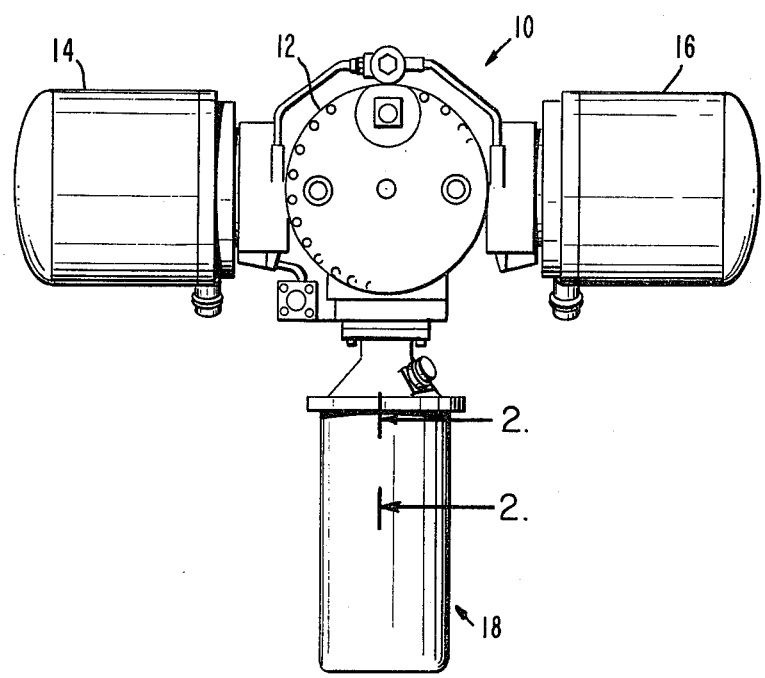
FIG. 1 is a plan view of a cryogenic refrigerator of the Vuilleumier type which serves as an example of an application for the helical seal of this invention.

Refrigerator 10 illustrated in FIG. 1 is an example of a machine having relatively sliding parts which can usefully employ the helical seal of this invention. Refrigerator 10 has a crank case 12 which has a crank therein for regulating the relative movement of the various parts. Hot cylinders 14 and 16 each contain a cylinder, a displacer in the cylinder, a heater at the outer end of the cylinder and a regenerator for exchanging heat with the refrigerant gas as the displacer displaces refrigerant gas from the hot outer end of the cylinder, to the ambient inner end of the cylinder. The inner end of the space through which the displacer moves is connected to the interior of crank case 12, and is considered to be at ambient temperature. In actuality, the temperature is slightly above ambient and it is from this region that the heat is rejected to the adjacent ambient.

Figure 2:
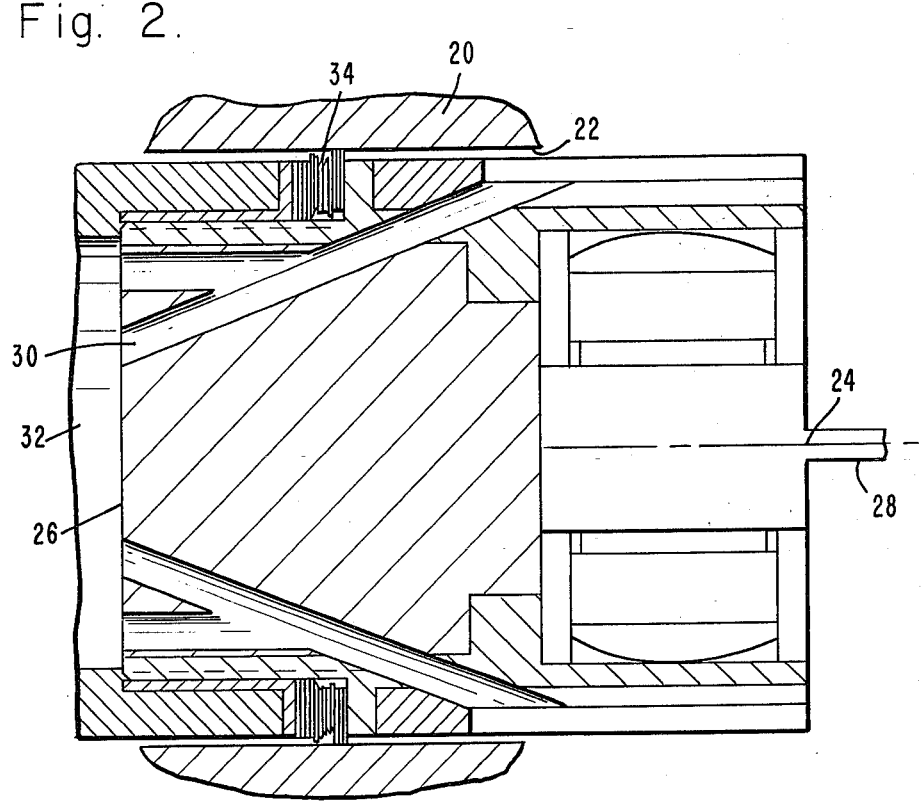
FIG. 2 is an enlarged section, with parts broken away, showing the helical seal on the warm end of the cold displacer in the refrigerator of FIG. 1.
Figure 3:
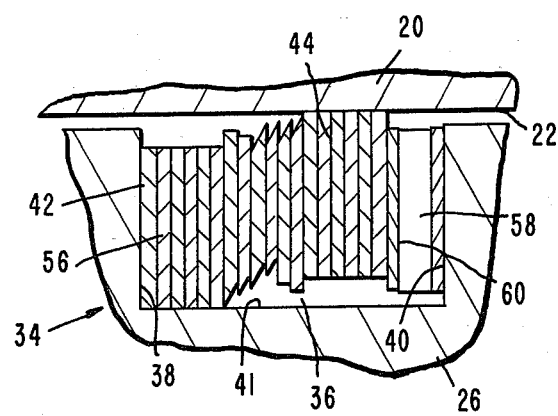
FIG. 3 is a further enlarged section, taken generally through a center-line plane showing the helical seal of this invention as installed.

Cold cylinder 18 may be a multi-stage cylinder with different cold temperatures at different stages. The helical seal of this invention is particularly useful as the warm end seal. The cold cylinder assembly comprises insulation, regenerators and cold stages where the useful refrigeration is produced. The refrigerator 10 is thus a Vuilleumier refrigerator, an example of which is shown in U.S. Pat. No. Re. 27,338. FIGS. 2 and 3 show the cylinder 20 having a cylinder wall 22. The cylinder is cylindrical about axis 24. Displacer 26 is reciprocated in the cylinder bore by means of rod 28 which is connected to the crank mechanism within crank case 12. All of the volumes of refrigerator 10 are connected together through regenerators. The volumes adjacent the hot end of the hot displacers, the crank case volume and the cold volumes at the cold ends of the several stages of the cold displacer 26 are connected together through regenerators so that the pressure in all volumes through the system is substantially the same at any one time. As the cranks move the displacers and the displacers displace the gas from one volume to another, a greater proportion of the refrigerant gas may be in the hot volume, the ambient volume or the cold volume to produce changes in refrigerant gas pressure in the entire system. It is these gas pressure changes that produce the refrigeration. Furthermore, since hot gas can be expanded in such a system, motive power can be derived therefrom so that the crank mechanism need only be a timing mechanism and need not provide input power to produce refrigeration. Furthermore, it is seen that there is not a substantial pressure difference along the length of the displacers, but only the pressure drop of the gas moving through the regenerators. Thus, seals in such a refrigerator are not subject to a large pressure drop but the seals are necessary to ensure that all of the displaced gas flows through the regenerator, for refrigeration efficiency.

In FIG. 2, displacer 26 has its right end open to the crank case. Ports 30 connect the crank case to the ambient end of regenerator space 32 which is packed with conventional regenerator packing. In order to force the displaced gas through regenerator space 32, seal 34 of this invention is provided.

Seal 34 is seated in groove 36 in displacer 26. Groove 36 is an annular groove with a cylindrical bottom end and walls lying in planes perpendicular to the axis 24. The groove end walls are indicated at 38 and 40 in FIG. 3 and the groove bottom is indicated at 41.

Figure 4:
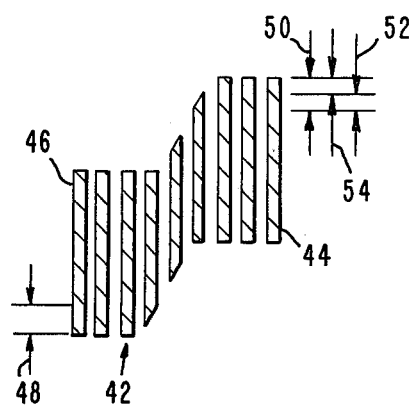
FIG. 4 is a transverse section through one helix of the seal of this invention in the undeflected position.
Figure 5:
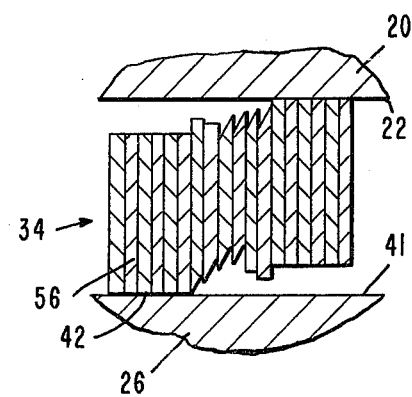
FIG. 5 is a section through the helical seal of this invention, showing interleaved helices, shown in the deflected position.

FIG. 4 illustrates helical coil 42 which serves as the principal part of seal 34. Helical coil 42 is formed of a hard, long-wearing sealing material that preferably has some resiliency. The helical coil illustrated in FIG. 4 is in its undeflected or unstressed condition. The helical coil 42 is preferably first formed of a tubular billet and is externally and internally shaped into the configuration shown. After the shaping, then the billet is spirally cut to produce the helical coil 42 illustrated. If the helix is a right hand helix, then the helical coil is twisted in the counter clock-wise direction at its large end 44 to reduce its outside diameter and is twisted in the clockwise direction at its small end 46 to increase its internal diameter. In this condition it is dimensioned as shown in FIG. 5, and is put in the seal groove 36. Suitable materials for the helical coil 42 include DELRIN AF PTFE (polytetrafluoroethylene) filled acetal, VESPEL 211 graphite and PTFE filled polyimide, LENNITE, ultra-high molecular weight polyethylene, and THERMID PTFE filled polyimide. The dimension 48 shows the amount of wind-up required to install the coil 42 on bottom 41. Dimension 50 shows the amount of wind-up required to get the new helical coil 42 into the seal groove and shows the dimension of the unworn coil when it is against the cylinder wall 22. Dimension 52 shows the remaining deflection at the end of the life of the seal while dimension 54 shows the projected seal wear within permissible seal life.

The outline of the starting billet of sealing material is configured by the diameter of the dynamic and stationary seal and whether the dynamic seal will be on the internal or external surface. Furthermore, the billet is configured in accordance with the projected allowance for seal wear. Also the billet is provided with a dimensional allowance on both the dynamic and stationary diameters to maintain a minimum tension on the seal surfaces at the end of the life of the seal. Furthermore, the outline of the billet is a function of the number of coils required to form the dynamic seal, transition, and stationary seal portions of the seal. All of these dimensions must be selected on the basis of the gland dimensions and the properties of the materials in contact. Such factors as wear rates, surface finishes, ultimate tensile strength, tensile moduli, elongations, hardness, creep, friction and machining properties must all be considered in the design.

The fundamental equation used to analyze the helical seal is the pressure-curvature relation $$P=(E/12)(h/R)^3(\Delta-3\Delta^2+6\Delta^3)$$

which says that the pressure, P, exerted by the seal against the cylinder wall is proportional to the thickness radius $h/R$ ratio to the third power. $\Delta$ is the change in curvature. Consequently, the pressure can be strongly influenced by the radial wear, r. For example, if the wear amounted to $\frac{1}{2}$ the thickness ($h_{worn}=h_{new}/2$) then the pressure supplied by the seal would fall to just one-eighth $(\frac{1}{2})^3$ of its original value. Since it is desirable to maintain the pressure, P, and thereby maintain the seal pressure, the worn thickness ($h_{worn}$) should be kept as near to the original ($h_{new}$) as possible. This approach suggests that the original thickness be made as large as possible, and accordingly, in this exemplar seal the thickness h was chosen to be 0.120 inches. This choice allows 0.005 radial clearance when the seal is installed in the gland, which has a 0.125 groove depth.

Having chosen h at 0.120 inches, the average radii of the seal then depend only upon the cylinder and piston dimensions. Thus, with a 1.895 diameter cylinder $$R_o=(1.895/2)-(0.120/2)=0.8875 \text{ inches}$$

Now chosen are the seal pressure $P_s$ and the seal material (which will determine Young's Modulus, E, etc.). The design should allow four (4) turns of the helix to contact the cylinder wall. It is thought that these 4 turns of the helix will act much like four seals in series in sealing against the pressure differential $\Delta P=8$ psi. Thus, a sealing pressure of $$P_s=\Delta P/4 \text{ turns}=8 \text{ psi}/4=2 \text{ psi}$$

seems appropriate.

The exemplar seal material Delrin AF is chosen because of small wear coefficients, k. Young's Modulus (E) and strength properties ($\sigma_{ult}$).

$$E=3.23\times10^5$$

$$\sigma_{ult}=6630 \text{ psi}$$

Using the values
P=2 psi
E=3.23×10$^5$ psi
h=0.120 inches
$R_o$=0.8875 inches
in the above equation gives $$\Delta-3\Delta^2+6\Delta^3=(12)(2)(0.8875/0.120)^3/(3.23\times10^5)=0.03006$$

Solving for $\Delta_o$ gives $$\Delta_o=0.0331=\delta_o/R_o$$

where the "o" subscript is for "outer" i.e., the outer radius toward the cylinder wall, as opposed to the "inner" radius against the piston gland. Then $$\delta_o=(0.0331)(0.8875)=0.0293$$

$$R_o+\delta_o=0.8875+0.0293=0.917 \text{ inches}$$

gives the undeformed radius of curvature of the helical coil and $R_o + \delta_o + (h/2) = 0.917 + (0.120/2) = 0.977$ inches gives $D_o = 0.977 \times 2 = 1.954$ inches as the "outer diameter" to which the stock should be machined to produce 2 psi seal pressure against the cylinder wall.

The basic helical coil 42 may be configured to be used alone, or in conjunction with another similar helix to enhance the wear, friction and anti-cold weld properties of the combination of materials. Preferably, a second helical coil 56 is screwed into the first to interleave the materials, particularly where the second helical coil is provided to supply dry lubricant to the harder helical seal coil 42. Polytetrafluroethylene is a suitable material for the second helical coil 56.

It is clear that the seal 34 can be used either in an installation around a cylindrical rod, such as a piston rod in which the smaller diameter is the dynamic seal and the larger diameter is the static seal, or in an installation as illustrated in FIG. 3 wherein the smaller diameter is the static seal and the larger diameter is the dynamic seal. The portion of the helical coil therebetween is the transition portion which carries the torque between the two sections.

When designed to fit a particular groove 36, the seal 34 which includes both coils 42 and 56, need not require any supplemental spring force. However, FIG. 3 illustrates wave spring 58 which bears against back-up washer 60 to provide axial compression to seal 34. With the axial compression provided by wave spring 58, there is no axial motion of seal 34, to thus increase the sealing capabilities and reduce some kinds of wear. Furthermore, in order to enhance the permissible radial expansion of the dynamic seal end, in this case the large end 44 of the seal 34, an interior expansion spring can be provided. Such an expansion spring can be a simple split ring which is stressed to expand outwardly, and it can be installed within the turns of the dynamic end of the seal. Thus, split ring springs may be used to complement the material dynamics of the seal materials.

After fabrication of the basic helix or the interleaved combination, the seal is wound or unwound as necessary to stress a stationary coil at the small end to provide the stationary seal at the small end. It is also wound or unwound as necessary to bring the dynamic seal into a diameter where it can fit against its dynamic surfaces. As the wear surface of the dynamic seal wears away, the spirals turn to replace the materials that have been lost by wear. During this turning, no gaps grow in size to increase a leak path.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

I claim:

1. A seal comprising:
a continuous helical spiral coil made of resilient material and having a small end, a large end of larger diameter than said small end and an intermediate transitional portion therebetween, said helical spiral coil being for positioning in a seal groove so that one of said ends seals in the groove as a stationary seal and the other of said ends extends out of the groove for engaging on a relatively moving wall as a dynamic seal, with the resiliency of said helical spiral coil stressing said helical spiral coil to engage both as a static seal in the groove and as a dynamic seal against the wall; and
a spring engaging said helical coil to thrust said helical coil in a direction parallel to the wall and axially of said helical coil to reduce axial motion between the turns of said helical coil.

2. A seal comprising:
a continuous first helical spiral coil made out of resilient wear resistant material, said helical coil having a small end, a large end of larger diameter than said small end and an intermediate transitional portion therebetween, said seal having a second helical coil interleaved with said first helical coil, said second helical coil being made of low friction, self-lubricating material, said interleaved helical coils being for positioning in a seal groove so that one of said ends seals in the grooves as a stationary seal and the other of said ends extends out of the groove for engaging on a relatively moving wall as a dynamic seal, with the resiliency of said helical coil stressing said helical coil to engage both as a static seal in the groove and as a dynamic seal against the wall; and
a spring in the groove engaging on said interleaved helical coils to thrust said interleaved helical coils in a direction parallel to said wall and axially of said interleaved helical coils to reduce axial motion between the turns of said interleaved helical coils.

3. The seal of claim 2 wherein said second coil includes polytetrafluoroethylene.

4. The seal of claim 1 further including in combination a groove and a wall facing said groove, said seal being positioned within said groove.

5. A helical seal comprising:
a first coil which is helical about a helix axis, said helical coil having a small diameter, a large diameter larger than said small diameter and an intermediate transition region therebetween, said first helical coil being made of resilient material so that rotation of one end of said helical coil with respect to the other end thereof around the axis of said helix changes the diameter of said coil, and resiliency urges said coil to unwind to return to its unstressed condition, said first helical coil being made of wear-resistant material;
a second helical coil interwound with said first helical coil, said second helical coil being formed of a soft lubricating low friction material to supply lubricant to said first helical coil; and
a spring engaging on at least one of said helical coils to thrust said helical coils in a direction axially of said helical coils to reduce axial motion between the turns of said helical coils.

* * * * *